United States Patent
Anani et al.

[11] Patent Number: 5,439,756
[45] Date of Patent: Aug. 8, 1995

[54] ELECTRICAL ENERGY STORAGE DEVICE AND METHOD OF CHARGING AND DISCHARGING SAME

[75] Inventors: Anaba A. Anani, Lauderhill; Frank P. Malaspina, Plantation; Gerald W. Blanton, Lighthouse Point, all of Fla.

[73] Assignee: Motorola, Inc., Schaumburg, Ill.

[21] Appl. No.: 203,098

[22] Filed: Feb. 28, 1994

[51] Int. Cl.⁶ .......................................... H01M 12/00
[52] U.S. Cl. .................................... 429/9; 429/50; 361/434; 361/503
[58] Field of Search .................. 429/9, 210, 50; 361/434, 503, 523

[56] References Cited

U.S. PATENT DOCUMENTS

| | | | |
|---|---|---|---|
| 3,288,641 | 11/1966 | Rightmire | 361/434 |
| 3,423,642 | 1/1969 | Plehal et al. | 361/434 |
| 3,538,394 | 11/1970 | Bourgault et al. | 361/434 |
| 4,830,938 | 5/1989 | McCullough et al. | 429/210 X |
| 4,900,643 | 2/1990 | Eskra et al. | 429/210 X |
| 5,147,739 | 9/1992 | Beard | 429/194 |

FOREIGN PATENT DOCUMENTS 59-14681  1/1984  Japan ........................ 429/9

Primary Examiner—Stephen Kalafut
Attorney, Agent, or Firm—Dale W. Dorinski

[57] ABSTRACT

Briefly, according to the invention, there is provided an energy storage device (5) with three electrodes. A first electrolyte (15) is situated between the first (10) and second (20) electrodes so that it is contact with each of the electrodes, forming a battery cell (80). A second electrolyte (25) is placed between the second (20) and third (30) electrodes so that it is also in contact with each electrode, forming an electrochemical capacitor (70). The battery and capacitor each share a common electrode (20). After charging, the energy storage device can be linked to an electrical device to power it by discharging the battery portion to provide a substantially constant voltage, and discharging the capacitor portion to provide a substantially constant current when the device requires higher levels of current than the battery portion is capable of providing.

20 Claims, 4 Drawing Sheets

ELECTRICAL ENERGY STORAGE DEVICE AND METHOD OF CHARGING AND DISCHARGING SAME

TECHNICAL FIELD

This invention relates in general to the field of electrical energy storage devices and more particularly to capacitors and battery cells.

BACKGROUND

The history of electrical energy storage devices, especially capacitors and batteries, has involved attempts to reduce the package size while increasing the electrical energy storage capacity. Recent advances in battery and capacitor design have increased the life, the efficiency, and the energy density. Although many of the devices embracing these advances have filled a need, there continues to be a requirement for efficient, high-powered electrical energy storage devices which can withstand the rigors of continuous use.

The need to store greater amounts of energy in ever smaller packages continues to drive new research into complex and esoteric ways of making storage devices. The result is that many batteries and capacitors have become expensive and complicated and also require sophisticated charging schemes and fabrication methods.

Electrochemical capacitors (EC) are similar to battery cells, in that they store electrical energy but unlike batteries, they rely on charge separation at the electrode/electrolyte interfaces to store this energy. The total energy stored by the EC is, for this reason, relatively small compared to conventional batteries. However, the power output of ECs is much higher than batteries. ECs are, therefore, more useful in applications that require high power in short bursts, whereas conventional batteries are more suitable for use in applications that require moderate power at sustained levels. Because battery cells store electrical energy in the form of chemical energy, a battery is capable of delivering a relatively constant and sustained level of voltage over a period of time, whereas, a capacitor voltage continually decreases as a function of time during discharge.

Power packages that combine one or more batteries and one or more capacitors are well known in the art and these devices attempt to provide the best of both worlds. For example, one well-known application is a photo flash. In this situation, the flash bulb or strobe requires an extremely high burst of energy to fire the strobe. Battery cells are incapable of providing this high intensity energy burst, but a capacitor is very well suited. The photo flash package uses a battery cell to charge the capacitor, and the capacitor is then discharged to provide the instantaneous burst of power. After the flash is over, the battery slowly recharges the capacitor, readying it for the next burst. Another type of application is in portable, hand-held radio transmitter/receivers. While the receiver is in standby mode, it requires a relatively constant but low level of voltage. However, during transmission, the receiver requires a burst of power to transmit the signal. Present day devices attempt to provide this high level of power using battery cells, because a capacitor by itself cannot provide the stable voltage required to sustain the device operation. In both these applications, conventional technology requires that the power package be a mechanical combination of a conventional capacitor and conventional battery cells. Clearly, a need exists for an electrical energy storage device that combines the desirable features of electrochemical batteries and capacitors, and can store large amounts of energy in a smaller package, and be manufactured at a reasonable cost.

SUMMARY OF THE INVENTION

Briefly, according to the invention, there is provided an energy storage device comprising three electrodes. An electrolyte is situated between the first and second electrodes so that it is in contact with each of the electrodes. A second electrolyte is placed between the second and third electrodes so that it is also in contact with each electrode.

In one embodiment of the invention, the energy storage device consists of a battery portion and a capacitor portion. The battery portion has a metal electrode and a metal hydroxide electrode with a potassium hydroxide electrolyte between and in contact with the two electrodes. The capacitor portion comprises the metal hydroxide electrode which is also common to the battery portion, and a third electrode of activated carbon. A potassium hydroxide electrolyte is situated between the metal hydroxide electrode and the carbon electrode.

In still another embodiment of the invention, a method of charging and discharging an energy storage device with three electrodes is provided. Electrical energy is provided to the first and second electrodes (the battery portion) at a constant voltage in order to charge the cell. Energy is also provided to the second and third electrodes at a constant current to charge the capacitor portion. The source of the energy for the capacitor charging may be from the battery portion or from an external power supply. After the energy storage device has been charged, it can be linked to an electrical device to power the device by discharging the battery portion to provide a substantially constant voltage to the electrical device, and discharging the capacitor portion to provide a substantially constant current to the device during those periods of time when the operation of the device requires higher levels of current than the battery portion is capable of providing.

DETAILED DESCRIPTION OF THE PREFERRED EMBODIMENT

Figure 1:
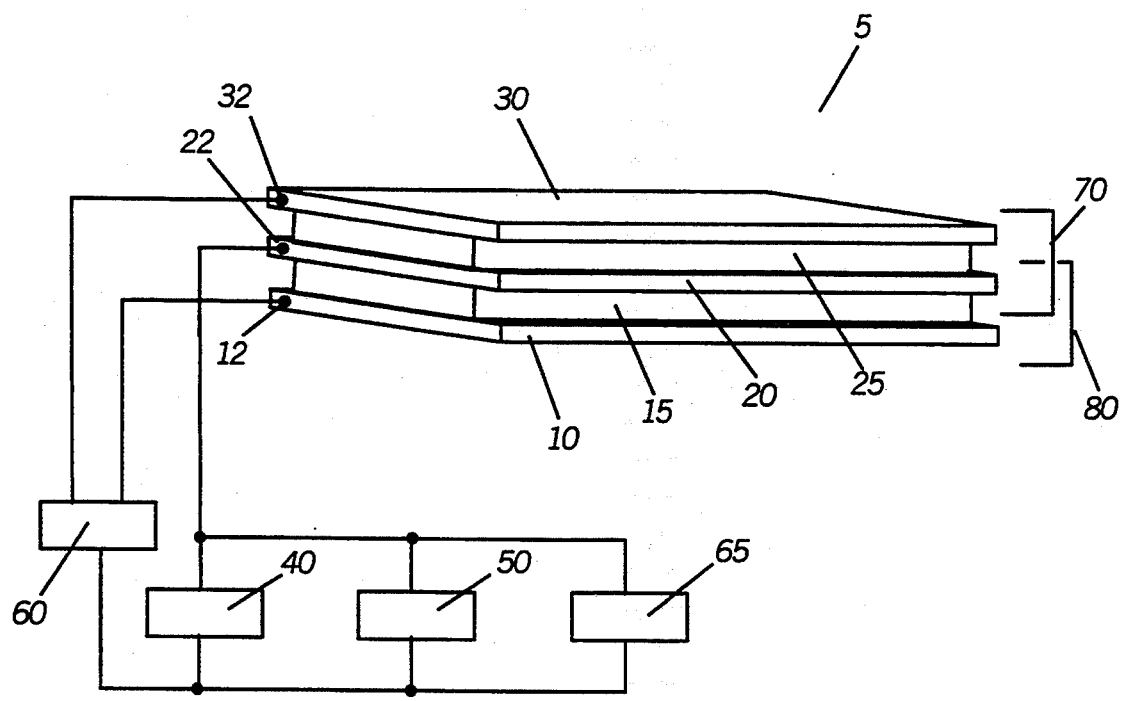
FIG. 1 is a schematic view of an electrical energy storage device in accordance with the present invention.

While the specification concludes with claims defining the features of the invention that are regarded as novel, it is believed that the invention will be better understood from a consideration of the following description in conjunction with the drawing figures, in which like reference numerals are carried forward. For sake of clarity, some features of the drawing have been exaggerated and intentionally are not drawn to scale.

The present invention involves a hybrid type of electrical energy storage device that utilizes a three electrode configuration. This three electrode configuration provides the advantages of both a battery cell and a capacitor in a single cell. Referring now to FIG. 1, the electrical energy storage device 5 consists of three electrodes. The first electrode 10 is paired with a second electrode 20 and has a first electrolyte 15 sandwiched in between. Although FIG. 1 depicts a laminar type structure, it is to be understood that this schematically represents, the concept, and that the electrodes could be situated in other manners and the electrolyte could either be a liquid electrolyte or a solid state electrolyte. The electrodes are so arranged that the first electrolyte 15 is in between and in intimate contact with each of the two electrodes 10 and 20. A third electrode 30 is arranged so that it can also be coupled with the second electrode 20. The second and third electrodes are arranged so that a second electrolyte 25 can be situated between the electrodes and also be in intimate contact with the electrodes. As can be seen in the drawing, the three electrodes 10, 20 and 30 form a structure wherein the two electrolytes are disposed between the first and second electrodes, and the second and third electrodes, respectively. In this arrangement, two of the electrodes function as a battery and two of the electrodes function as a capacitor. It should be apparent that the selection of the pair of electrodes that is the capacitor or the battery is entirely arbitrary. In either case, the structure of the electrical energy storage device is such that the second electrode 20 is common to both the battery portion 80 and the capacitor 70. For sake of example, the first and second electrodes 10 and 20 and the first electrolyte 15 could comprise the battery portion 80, while the second and third electrodes 20 and 30 and the second electrolyte 25 could comprise the capacitor portion 70, or vice versa. First and second electrolytes 15 and 25 do not necessarily need to be of the same material, and selection of the electrolyte will be a function of the selection of the electrodes.

In a preferred embodiment of the invention, the first electrode 10 is typically a metal electrode, for example, cadmium. Other materials useful as the metal electrode are lanthanum, cerium, Misch metal and hydrides of each of these metals. MISCH metal is an alloy consisting of a mixture of cerium, lanthanum, and other rare earth metals. The alloy is obtained by electrolysis of the mixed chlorides of the metals that are dissolved in fused sodium chloride. MISCH metal is commonly used for coating cathodes of glow-type voltage regulator tubes. In this embodiment, the second electrode is a nickel-hydroxide electrode. With cadmium and nickel hydroxide electrodes, a potassium hydroxide based electrolyte is typically used. The third electrode that comprises the capacitor portion is a material such as activated carbon dispersed on a support. The second electrolyte 25 is also a potassium hydroxide based material. In this arrangement, the cadmium and nickel hydroxide electrodes form the battery portion of the energy storage device, similar to a nickel-cadmium rechargeable battery, while the nickel hydroxide and activated carbon electrodes form the capacitor portion of the battery and serve as the area of charge storage. The nickel-hydroxide electrode is common to both the battery portion and the capacitor, and thereby forms an energy storage device that is much more compact and integrated than those of the prior art that use separate and distinct batteries and capacitors that are externally wired together.

In order to effectively utilize the energy storage device 5, it must be capable of being charged and discharged. The battery and capacitor portions are connected to the outside world by means of a contact 12, 22, 32 on each electrode. In practice, a switching means or device 60 is connected to each of the contacts 12, 22, 32 (and subsequently to each of the three electrodes) in such a manner as to switch the output of the device 5 between the battery portion 80 and the capacitor portion 70. The switching means 60 could be a manually activated or electrically activated switch, or could be a controller or microprocessor that automatically and rapidly switches or cycles between the two portions 70, 80 at a rate high enough to be imperceptible to an individual or the end user of the power supply. The output of the switching means then goes to the device 65 being powered. Other sophistications in the invention are elements such as a sensing means 40 that senses the state of charge of the respective battery and capacitor portions 70, 80 and/or the power requirements of the electrical device 65.

In order to charge the energy storage device 5, a power supply 50 can be connected to the set of three contacts 12, 22, 32 and electrical energy can be stored in either or both the capacitor portion 70 and the battery portion 80. This storage of charge can be done simultaneously or at two different times. Typically in recharging the battery, a constant voltage is applied across the first electrode 10 and second electrode 20. Charging the capacitor portion, a constant current is applied across the second electrode 20 and the third electrode 30. However, variations of this scheme can also be employed within the bounds of the invention. For example, both the current and voltage could be varied during charging the battery portion or the capacitor portion.

In one manner of charging, the power supply 50 supplies energy to the battery portion 80 of the electrical energy storage device, and the battery portion 80 subsequently provides power to the capacitor portion 70. In essence, the power supply 50 is charging the battery 80 and the battery is charging the capacitor 70. A further refinement of this process occurs during the discharging of the energy storage device in which the capacitor is discharged and then recharged by energy stored in the battery portion. In essence, as the capacitor is discharged, it regains its charge from the electrochemical action in the battery portion.

An example of a preferred embodiment of the electrical energy storage device will now be illustrated.

EXAMPLE 1

An electrical energy storage device was made using a cadmium electrode, a nickel ($NiOOH/Ni(OH)_2$) electrode and a high surface-area carbon electrode. The cadmium electrode was a conventional electrode of the type used in rechargeable Ni/Cd battery cells, while the nickel electrode was a type used in conventional nickel/metal hydride, Ni/Cd, and/or Ni/$H_2$ cells. The activated carbon electrode was prepared by:

(i) mixing activated carbon, TEFLON 30 solution (a fluorocarbon polymer dispersion from E. I. Dupont deNemours containing about 60% TEFLON), and a solution of ammonium carbonate ($NH_4)CO_3$ in a mixer;

(ii) cold pressing the mixture onto a nickel and/or copper gauze to form a disc about 1 mm thick; and (iii) baking the formed disc at 120° C.

The electrical energy storage device was made by attaching current collectors onto each electrode. Thereafter, the electrodes were sandwiched together in a planar configuration with perforated Plexiglas plates machined to accommodate the different thicknesses of electrodes. To prevent shorting of the electrodes, each one was separated from the other with a double layer of non-woven polypropylene sheet. The entire assembly was immersed in a KOH solution (approximately 30%) to form a flooded cell configuration, the KOH solution acting as the electrolyte. In this configuration, the nickel electrode acts as the dual purpose electrode. When paired with the Cd electrode, they constitute the battery portion of the cell, and when paired with the activated carbon electrode, they constitute the capacitor portion of the cell.

Figure 2:
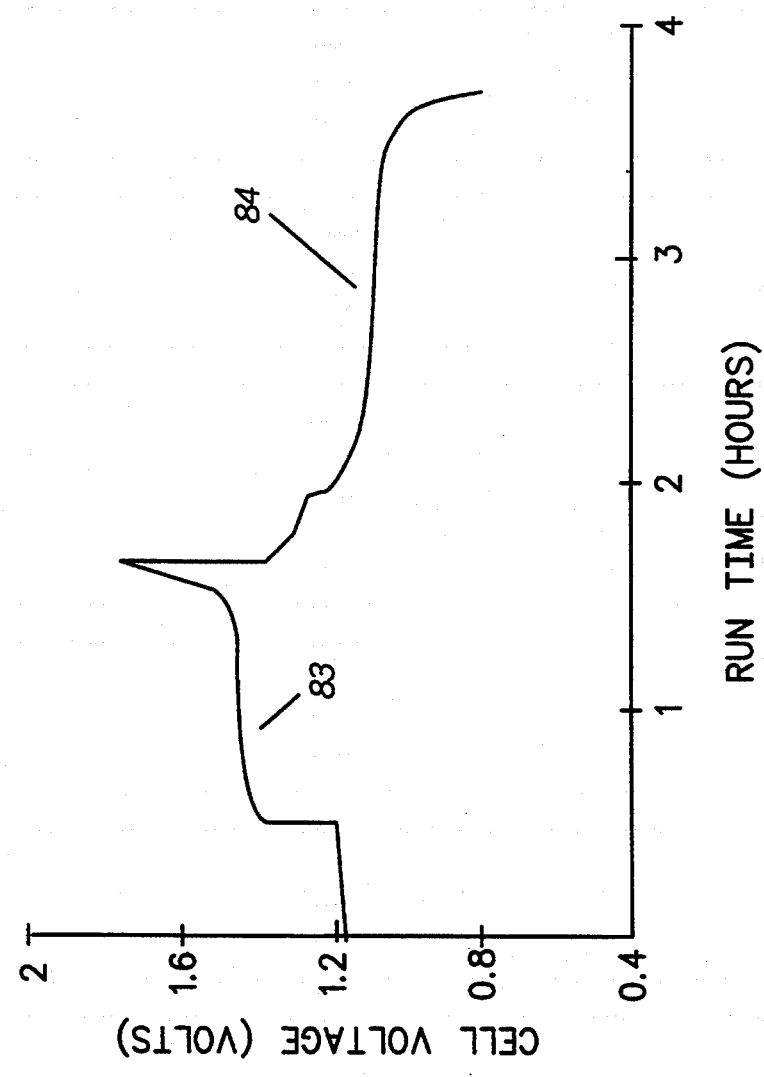
FIG. 2 is a charge/discharge profile of the battery portion of an electrical energy storage device for the 30th cycle, in accordance with the invention.

The constant current charge/discharge experiment on the battery portion of the electrical energy storage device was performed by applying the constant current across the nickel and cadmium electrodes. Upon full charge, the electrical energy storage device was allowed to equilibrate before the discharge step was applied. The operating voltage window was typically between 0.8 V to 1.7 V. FIG. 2 represents the charge/discharge profile of the battery portion for the 30th cycle. The battery capacity of the electrical energy storage device was about 25 mAh (measured by a slow discharge of 1 mA current). Charge rates greater than 2 C were employed in charging the cells, while the highest discharge currents employed was 1 C. Nominal voltages during the charging profile 83 were around 1.3 to 1.4 volts, while during the discharge profile 84, they were around 1.1 to 1.2 volts. The lowest Faradaic efficiency obtained for this portion of the electrical energy storage device was 92%, during the first few cycles. However, after about 8-10 cycles, the efficiency went up to >95%. These experiments were conducted for about 50 cycles before they were discontinued, demonstrating the well documented behavior of a Ni/Cd cell.

Figure 3:
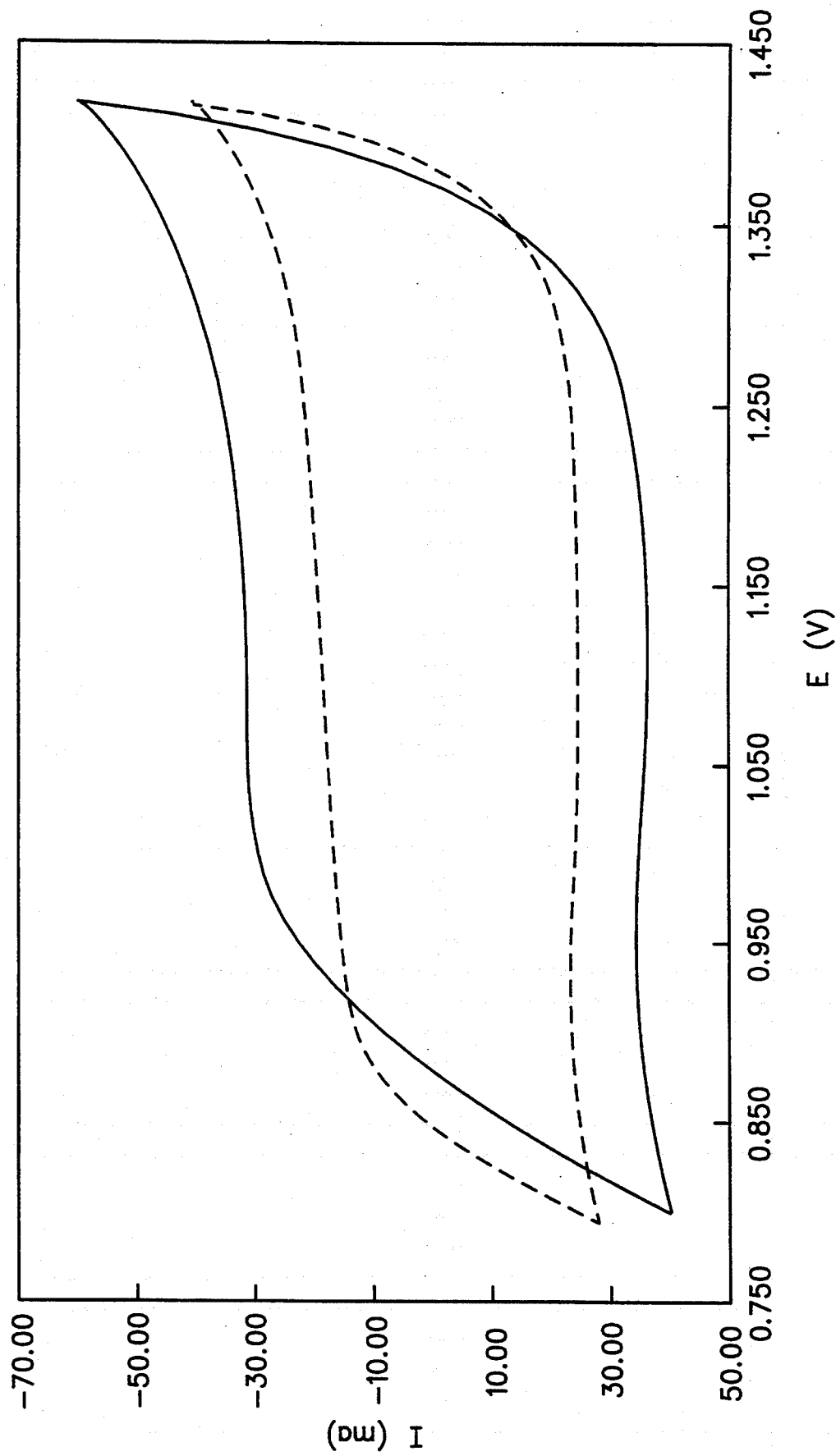
FIG. 3 is a cyclic voltammogram of the capacitor portion of an electrical energy storage device.

The capacitor portion of the electrical energy storage device was scanned potentiostatically from about 0.6 to 1.6/1.8 V. Voltage for the capacitor portion was measured relative to the activated carbon electrode. FIG. 3 shows typical cyclic voltammograms of the capacitor cell scanned at 10 and 20 mV/s from 0.8 to 1.4 V. These voltammograms represent the 1000th and 1200th cycles for the 10 and 20 mV/s scans respectively. It is important to note that this materials combination will yield a capacitance much higher than that realized from a conventional carbon double layer capacitor. This is due in part to the fact that the potential of the nickel electrode does not vary significantly during a potentiostatic sweep, and changes in the cell voltage reflect mostly potential changes in the carbon electrode. Hence the entire voltage regime of the carbon electrode can be utilized for charge storage, resulting in a capacitor with a higher charge storage capability, (and thus energy), that the conventional double layer type.

Figure 4:
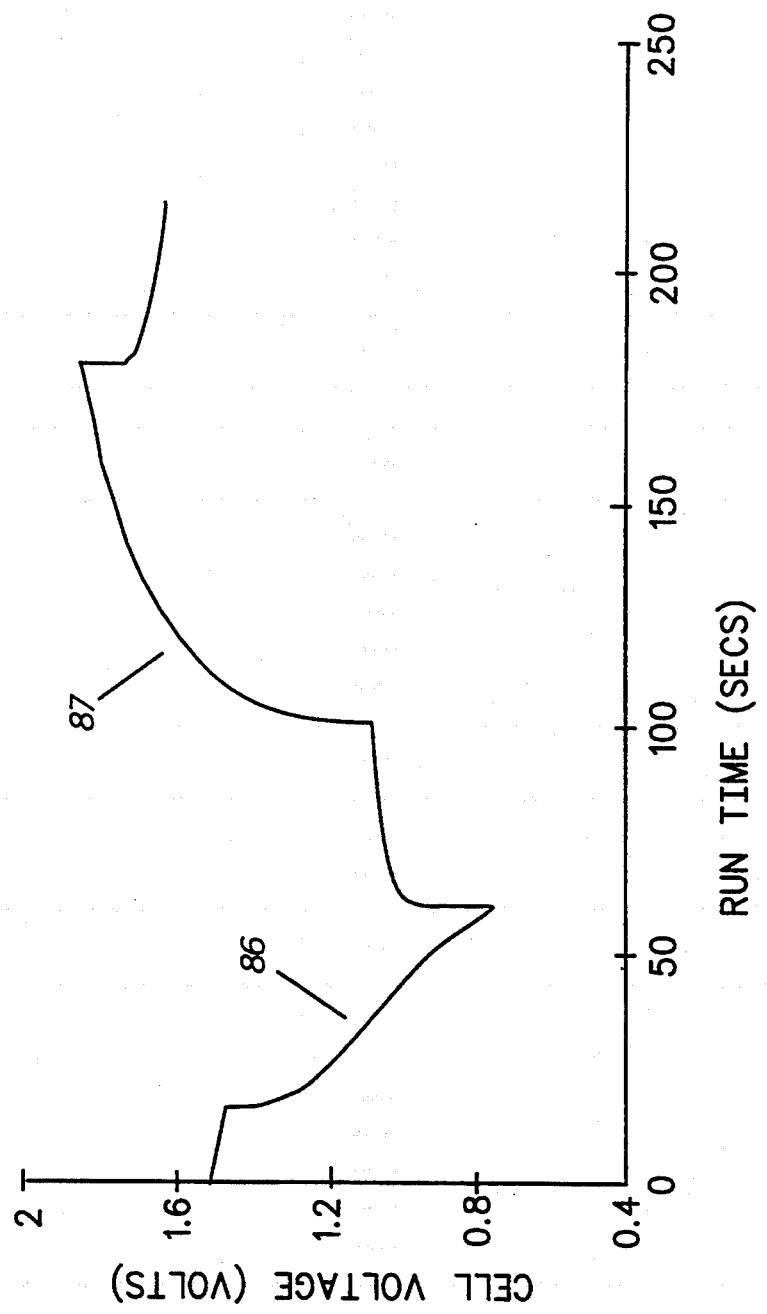
FIG. 4 is a charge/discharge profile of the capacitor portion of an electrical energy storage device, in accordance with the invention.

FIG. 4 is a typical charge/discharge profile of the capacitor portion of the electrical energy storage device. As expected, both the charge and discharge profiles (87 and 86, respectively) exhibit "linear" function behavior of the device voltage with respect to time, with an initial ohmic resistance effect at the onset of charge and discharge. This ohmic resistance, which can be attributed to the electrodes, should decrease with appropriate optimization of electrode and cell structures as well as electrodes/electrolyte interfaces. The profile exhibited in this figure represents the 500th constant current charge/discharge cycle of the capacitor cell.

While a preferred embodiment of the invention has been illustrated and described, it will be clear that the invention is not so limited. The electrode combination discussed in the preceding paragraphs should not be construed to represent the only possible battery/capacitor combination. There are several other examples, as well as variations and/or combination of the above, that could be used to illustrate the hybrid concept. Also, the cell need not be of a flooded configuration. As one example of an alternative, the cadmium electrode could be replaced by a metal hydride electrode, resulting in an alternate embodiment of the cited example. Further, replacing the electrodes with reversible lithium storage electrodes, and the electrolyte with a lithium ion conducting electrolyte will result in yet another embodiment of the invention. In the example cited above, the central electrode acts as the electrode for both the battery and capacitor portions of the cell. In yet a separate embodiment of the present invention, it is possible to fabricate this dual purpose electrode to be of a bi-polar nature, and separated by a metallic film/foil current collector. In this case, each side of the electrode will serve a single function, either as the battery or capacitor electrode. Since the metallic current collector provides separation in the bipolar electrode, the electrolyte in the two compartments need not be the same.

When used to power an electrical device, the energy storage system would provide power to the device by discharging the battery portion 80 to provide the substantially constant voltage required by the device. During those periods of time when the electrical device 65 requires higher levels of power then the battery 80 is capable of providing, the sensing means 40 would determine this, and the switching means 60 would switch the output of the storage device 5 from the battery portion 80 to the capacitor portion 70. When the requirement for a high burst of power is over, the switching means 60 then switches back to the battery portion 80, and the capacitor portion is recharged. This series of switching back and forth can clearly be done in any order and one can certainly conceptualize that a connecting scheme between the three electrode system could be arranged whereby power could be drawn off of both portions of the energy storage device simultaneously. That is to say, the battery portion 80 and the capacitor portion 70 could both power the device simultaneously.

In summary, it can be seen that a hybrid electrical energy storage device has been created that results in a smaller, more energy efficient package. Rather than externally connecting a conventional battery and a conventional capacitor, a three electrode system is created whereby one of the electrodes is common to both the battery and the capacitor, thereby making a much more efficient and compact structure. Numerous modifications, changes, variations, substitutions and equivalents will occur to those skilled in the art without departing from the spirit and scope of the present invention as defined by the appended claims.

What is claimed is:

1. An energy storage device, comprising:
   first, second, and third electrodes;
   a first electrolyte, disposed between and in contact with the first and second electrodes; and
   the first electrode, the first electrolyte, and the second electrode comprising a battery;

a second electrolyte, disposed between and in contact with the second and third electrodes; and the second electrode, the second electrolyte, and the third electrode comprises a capacitor.

2. The energy storage device of claim 1, wherein the second electrode is a common electrode, shared by both the battery and the capacitor.

3. The energy storage device of claim 1, wherein the battery portion is electrically coupled to the capacitor portion, external to the device.

4. An energy storage device, comprising:
a battery portion and a capacitor portion;
the battery portion comprising;
a first electrode, a second electrode, and a first electrolyte; and
the first electrolyte disposed between and in contact with the first and second electrodes;
the capacitor portion comprising;
the second electrode, a third electrode, and a second electrolyte; and
the second electrolyte disposed between and in contact with the second and third electrodes; and
the second electrode common to both the battery portion and the capacitor portion.

5. The energy storage device of claim 4, further comprising a first electrical contact coupled to the first electrode, a second electrical contact coupled to the second electrode, and a third electrical contact coupled to the third electrode.

6. The energy storage device of claim 5, further comprising a switching means coupled to the second electrical contact, to electrically switch between the battery portion and the capacitor portion.

7. The energy storage device of claim 5, further comprising a sensing means to determine the state of charge of the battery portion and the capacitor portion, the switching means coupled to and responsive to the sensing means.

8. An energy storage device, comprising:
a battery portion and a capacitor portion;
the battery portion comprising;
a metal electrode comprising one or more materials selected from the group consisting of cadmium, lanthanum, cerium, Misch metal, and hydrides thereof;
a nickel hydroxide electrode; and
potassium hydroxide electrolyte disposed between and in contact with the metal electrode and the nickel hydroxide electrode;
the capacitor portion comprising;
the nickel hydroxide electrode;
a third electrode comprising activated carbon; and
potassium hydroxide electrolyte disposed between and in contact with the nickel hydroxide electrode and the third electrode; and
the nickel hydroxide electrode common to both the battery portion and the capacitor portion.

9. The energy storage device of claim 8, further comprising a switching means coupled to the nickel hydroxide electrode, to electrically switch between the battery portion and the capacitor portion.

10. The energy storage device of claim 8, further comprising a sensing means to determine the state of charge of the battery portion and the capacitor portion, the switching means responsive to the sensing means.

11. A method of charging an energy storage device having a battery portion and a capacitor portion and at least one electrode common to both portions, comprising:
applying electrical energy to the capacitor portion; and
charging the capacitor portion of the energy storage device at a constant current.

12. The method as described in claim 11, further comprising applying electrical energy to the battery portion to charge that portion of the energy storage device at a constant voltage.

13. The method as described in claim 11, wherein the electrical energy is supplied by a source external to the energy storage device.

14. The method as described in claim 11, wherein the electrical energy is supplied from the battery portion of the energy storage device.

15. A method of charging an energy storage device having a battery portion and a capacitor portion and at least one electrode common to both portions, comprising:
applying electrical energy to the battery portion; and
charging the battery portion of energy storage device at a constant voltage.

16. The method as described in claim 15, wherein the electrical energy is supplied by a source external to the energy storage device.

17. A method of powering an electrical device using an energy storage system having a battery portion and a capacitor portion and at least one electrode common to both portions, comprising:
discharging the battery portion of the energy storage system to provide a substantially constant voltage to the electrical device; and
discharging the capacitor portion of the energy storage system to provide a substantially constant current to the device during those periods of time when operation of the device requires higher levels of current than the battery portion is capable of providing.

18. The method as described in claim 17, further comprising a final step of recharging the capacitor portion of the energy storage system by providing electrical energy from the battery portion.

19. The method as described in claim 17, wherein the steps are performed in any order.

20. The method as described in claim 17, wherein the steps are performed simultaneously.

* * * * *